United States Patent
Jain

(10) Patent No.: US 7,489,117 B2
(45) Date of Patent: Feb. 10, 2009

(54) DYNAMIC CONVERSION CIRCUIT FOR A VOLTAGE REGULATOR MODULE

(75) Inventor: Praveen Jain, Kingston (CA)

(73) Assignee: CHiL Semiconductor Corporation, Tewksbury, MA (US)

( * ) Notice: Subject to any disclaimer, the term of this patent is extended or adjusted under 35 U.S.C. 154(b) by 270 days.

(21) Appl. No.: 11/261,660

(22) Filed: Oct. 31, 2005

(65) Prior Publication Data

US 2007/0096703 A1 May 3, 2007

(51) Int. Cl.
*G05F 1/613* (2006.01)
*G05F 1/00* (2006.01)

(52) U.S. Cl. ........................ 323/224; 323/272
(58) Field of Classification Search ................. 323/222, 323/259, 282–284, 290, 344, 269, 272, 224
See application file for complete search history.

(56) References Cited

U.S. PATENT DOCUMENTS

| | | | |
|---|---|---|---|
| 5,555,165 A | 9/1996 | Vinciarelli ................... 363/95 |
| 5,731,731 A | 3/1998 | Wilcox et al. ................ 327/403 |
| 5,946,210 A | 8/1999 | Montminy et al. ............ 700/97 |
| 6,188,209 B1 | 2/2001 | Poon et al. .................. 323/255 |
| 6,225,795 B1 | 5/2001 | Stratakos et al. ............ 323/283 |
| 6,285,175 B1 | 9/2001 | Massie ........................ 323/290 |
| 6,307,356 B1 | 10/2001 | Dwelley ...................... 323/282 |
| 6,351,108 B1 | 2/2002 | Burstein et al. ............. 323/283 |
| 6,498,467 B1 | 12/2002 | Stratakos .................... 323/284 |
| 6,545,450 B1 | 4/2003 | Ledenev et al. .............. 323/272 |
| 6,593,724 B1 | 7/2003 | Chen .......................... 323/283 |
| 6,696,823 B2 | 2/2004 | Ledenev et al. .............. 323/272 |
| 6,696,825 B2 | 2/2004 | Harris et al. ................. 323/282 |
| 6,696,882 B1 | 2/2004 | Markowski et al. ......... 327/531 |
| 6,703,814 B2 | 3/2004 | Pohlman et al. ............. 323/272 |
| 6,791,302 B2 | 9/2004 | Tang et al. ................... 323/272 |
| 6,803,752 B1 | 10/2004 | Chen .......................... 323/282 |
| 6,809,504 B2 | 10/2004 | Tang et al. ................... 323/274 |
| 6,819,537 B2 | 11/2004 | Pohlman et al. ............... 361/64 |
| 6,825,642 B2* | 11/2004 | Brooks ....................... 323/272 |
| 6,828,765 B1 | 12/2004 | Schultz et al. ............... 323/284 |
| 6,897,715 B2 | 5/2005 | Barber, Jr. et al. .......... 327/541 |
| 6,909,265 B2 | 6/2005 | Tang .......................... 323/274 |
| 6,943,535 B1 | 9/2005 | Schiff ......................... 323/246 |
| 6,965,502 B2 | 11/2005 | Duffy et al. .................. 361/18 |
| 6,975,494 B2 | 12/2005 | Tang et al. .................... 361/64 |
| 7,109,689 B2* | 9/2006 | Schneider ................... 323/272 |
| 7,215,101 B2* | 5/2007 | Chang ........................ 323/224 |
| 7,259,473 B2* | 8/2007 | Petricek ....................... 307/44 |
| 2003/0090255 A1* | 5/2003 | Bassett et al. ............... 323/284 |
| 2004/0095104 A1* | 5/2004 | Brooks ....................... 323/272 |
| 2004/0245970 A1* | 12/2004 | Todd et al. .................. 323/272 |
| 2005/0184712 A1* | 8/2005 | Wei et al. .................... 323/282 |
| 2005/0184713 A1* | 8/2005 | Xu et al. ..................... 323/282 |

* cited by examiner

*Primary Examiner*—Shawn Riley
(74) *Attorney, Agent, or Firm*—Chapin IP Law. LLC

(57) ABSTRACT

The invention relates to a dynamic conversion circuit for improving the transient response of a switching DC-DC converter, such as in a voltage regulator module (VRM). The dynamic conversion circuit may be applied to a single phase or multiphase interleaved VRM of either isolated or non-isolated design configurations, and enhances power transfer from the input to the output of the DC-DC converter and tightly regulates the output voltage during harsh load current transients.

38 Claims, 7 Drawing Sheets

DYNAMIC CONVERSION CIRCUIT FOR A VOLTAGE REGULATOR MODULE

FIELD OF THE INVENTION

This invention relates generally to a voltage regulator module (VRM). In particular, the invention relates to a dynamic conversion circuit for enhancing the transient response of a DC-DC converter of a VRM for demanding loads such as microprocessors.

BACKGROUND OF THE INVENTION

A voltage regulator module (VRM) is used to regulate a DC voltage supplied to a load, such as microprocessor. A VRM includes a power converter, such as a DC-DC converter, and may include other components such as a controller for controlling operation of the power converter. An example of a DC-DC converter is a synchronous buck converter, as shown in FIG. 1, which has minimal components, and therefore is widely used in VRM applications. In microprocessor applications, the input voltage to the VRM is typically $12V_{DC}$. The output voltage may be 5.0 $V_{DC}$, 3.3 $V_{DC}$, or lower.

As microprocessors become more advanced, required supply voltages become lower. Supply voltages are expected to be as low as 0.5 $V_{DC}$ in the near future, which will require currents up to 200 A or more. Currently, the CPU of a typical personal computer operates at 3 GHz, and operating frequencies are expected to reach 10 GHz in the near future. A consequence of the low supply voltage and high clock frequency is the high slew rate (di/dt) of the load current at power up. For example, when a microprocessor wakes from sleep mode to full operating mode, the step of the output current may be as high as 200 A, with a slew rate of 1,000 A/µs or higher. The slew rate may reach 1,000 A/µs in future designs. The voltage supplied to current microprocessors is required to be regulated within 2%, and 1% for future VRMs ("VRM 9.1 DC-DC converter design guidelines", Intel Order Number 298646-001, January 2002). The absolute value of such voltage regulation is currently 30 mV and 10 mV for future designs. Such tight voltage regulation is required to maintain normal operation of CMOS transistors in the microprocessor under all conditions. For instance, under worst case (high slew rate of the output current) conditions, the output voltage should not drop by more than 30 mV to avoid abnormal operation of the CPU. However, the voltage drop of VRMs based on existing designs may be so large that the output voltage regulation limit may easily be exceeded.

Various VRM topologies and control methods have been proposed in an attempt to satisfy the transient response requirements of microprocessors. However, such designs are not well-suited to the harsher dynamic requirements of next generation microprocessors.

For example, simply increasing the output capacitance can reduce the output voltage ripple, and also help maintain the output voltage during a sudden load change. However, for a single phase 1.5 $V_{DC}$/25 A VRM, for instance, a design that can meet the steady state and transient voltage regulation specification typically requires at least 5,000 µF output capacitance. Such filter capacitors are bulky and expensive. It is estimated that for a VRM supplying 0.5 $V_{DC\ at}$ 100 A, the required output capacitance would be more than 10,000 µF, and should have considerably lower equivalent series inductance (ESL) and equivalent series resistance (ESR) to be effective during load transients. FIG. 2 (top curve only) shows such a relationship between the output capacitance and load current for typical prior VRMs. Although multiphase topology, which helps to reduce output capacitance, may be used for applications when the load current exceeds 20 A, the value of the capacitance is still exceedingly high at high load current.

Reducing the output inductance of a buck converter can improve its dynamic response. However, the inductance can not be reduced unbounded, otherwise the output voltage ripple will increase above acceptable limits (e.g., above 10 mV for next generation microprocessors). The increased voltage ripple will in turn reduce the room for the output voltage drop during dynamics. In addition, a larger ripple current through the filter inductor implies a larger RMS current through the power switches, which will reduce the overall efficiency of the VRM under steady state operation. Moreover, even though the inductance can be reduced for a faster dynamic response, it is not enough to provide adequate response speed for future microprocessors if the output capacitance is required to be small to reduce cost and to satisfy size and volume constraints.

Multiphase interleaved VRM topology provides two or more power converters in parallel and shares the same output capacitors among converters. In each of the power converters (or each phase), the filter inductor can be smaller than that of a single phase VRM to achieve a faster dynamic response. The large output voltage ripple in each phase due to the small inductance can be cancelled by the ripple of other phases. The more phases are in parallel, the smaller the ripple will be, but at the expense of increased circuit cost. Multiphase topology can therefore enhance the output current capability of a VRM. However, if the output current can be provided by a single phase VRM or a VRM with fewer phases, then adopting a multiphase topology or adding extra phases in parallel solely for the purpose of reducing the ripple voltage adds considerable complexity, size, and cost. More importantly, it is very difficult for a conventionally-controlled multiphase VRM to achieve the dynamic response required by future microprocessors, without having very large output capacitance.

Current mode control has a faster dynamic response than that of conventional voltage mode control, in situations where only a small perturbation such as a small load change occurs. However, its dynamic performance is not superior to that of voltage mode control when a large transient occurs. More importantly, in current mode control, the current is detected by employing a sensing resistor or a current transformer. However, for an output current of 100 A or higher, it would be impractical to use a resistor to accurately and efficiently sense the current. On the other hand, a current transformer is bulky and the sensed current must be averaged, resulting in further increases in the reaction time and drop in the output voltage when a large load step happens.

The voltage droop control method takes advantage of the upper and lower limits of the VRM output voltage to gain more room for dynamic responses. When the load current is low, the reference voltage is set to be higher than the nominal value but still within the specified upper limit. When a load step-up happens, the output voltage will drop but will have more room to drop than if it were starting from the nominal value. When the load current is high, the reference voltage is set to be low; thus when a load step-down happens, the output voltage has more room for the overshoot. However, this small room is far from being enough to handle the harsh dynamic requirements of the next generation microprocessors. Moreover, the voltage droop control method also requires current sensing, which again is not very practical, as discussed above.

Operating the power converter at a very high frequency will improve the dynamic response of a VRM having a very small output capacitance. However, design of an efficient power converter operating at a very high frequency is difficult. Further, the efficiency of a power converter decreases eventually to an unacceptable or unsatisfactory level as its operating frequency increases. In general, increasing the switching frequency of a power converter solely for the purpose of improving the dynamic performance is not an optimum solution.

A linear regulator array inserted between the VRM and the load was disclosed in U.S. Pat. No. 6,429,630, issued Aug. 6, 2002 to Pohlman et al. This intermediate linear regulator removes the strict requirement on the output voltage regulation of the VRM, making the design of the VRM much simpler. However, during normal steady state operation at full load, for example, the voltage drop across the linear regulator together with the DC current through it results in power loss. The power loss may not be a problem when the load consumes only a small amount of current, and this solution can possibly provide the required dynamic response. However, loads such as the next generation CPU will demand a large load current, which would require a linear regulator to dissipate power excessively during normal steady state operation. In addition, partitioning of the CPU into different power zones and an associated interface are required to make linear regulation feasible, because a single transistor is not capable of delivering a high current and at the same time effectively dissipating the heat due to the large power loss. Wide acceptance of such designs is unlikely, especially when other solutions potentially exist. Therefore, the linear regulator is impractical for applications in future microprocessors.

A stepping inductor method for fast transient response of switching converters is disclosed in U.S. Pat. No. 6,188,209, issued Feb. 13, 2001 to Poon et al. Relative to the basic buck converter, this design requires significantly more circuit components, which may be difficult and expensive to implement in a multiphase interleaved VRM, because all of the components need to be repeated for each phase. Moreover, the control circuit for load transients is analog based and the output voltage is compared to fixed hysteresis reference voltages to trigger and terminate the transient operation of the converter independently of the load current conditions. This implies that the transient circuit works the same way for a 25%, 50%, and 100% load step, for instance. Therefore, the voltage response during a load transient is not regulated and may exceed the specified limits of the output voltage during many load conditions.

A transient override circuit is proposed in U.S. Pat. No. 6,696,882, issued Feb. 24, 2004 to Markowski et al. This circuit detects the load voltage level to trigger a transient operation mode of the VRM. In transient operation mode, the power switch of a buck converter is forced to be turned on, and the synchronous power switch of the buck converter is turned off, to override the current through the output inductor. However, the circuit and the control method are analog based, and, importantly, are not able to regulate the output voltage during the transient.

SUMMARY OF THE INVENTION

According to one aspect of the invention there is provided a dynamic conversion circuit for increasing power output of a switching DC-DC converter during a load transient, comprising: a series circuit comprising a switch, the series circuit connected in parallel with at least a portion of the DC-DC converter; wherein the switch is activated in accordance with the load transient; and wherein activation of the switch comprises turning the switch on and off at a frequency higher than a switching frequency of the DC-DC converter.

The switch may be activated in accordance with a load transient associated with at least one of: (i) a decrease in the output voltage of the DC-DC converter below a minimum output voltage; and (ii) an increase in output current of the DC-DC converter above an operating output current.

In one embodiment, the series circuit further comprises a series inductor. Preferably, the inductor of the series circuit is of a smaller inductance value than an output inductor of the DC-DC converter. In another embodiment, the at least a portion of the DC-DC converter comprises a series output inductor. In another embodiment, the series circuit is connected in parallel with the DC-DC converter.

Activation of the switch may comprise turning the switch on and off with a pulse train of constant duty cycle, the pulse train having a frequency higher than the switching frequency of the DC-DC converter. In another embodiment, activation of the switch may comprise turning the switch on and off with a pulse train of varying duty cycle, the pulse train having a frequency higher than the switching frequency of the DC-DC converter.

In another embodiment, the dynamic conversion circuit may further comprise a controller for sensing the output voltage of the DC-DC converter and controlling activation of the switch.

In various embodiments, the DC-DC converter may be of isolated or non-isolated circuit topologies, such as buck, boost, and buck-boost circuit topologies. In a preferred embodiment, the DC-DC converter is a buck converter.

According to another aspect of the invention there is provided a voltage regulator module (VRM), comprising: a switching DC-DC converter having an input for accepting an input DC voltage and an output for outputting a converted DC voltage to a load; the dynamic conversion circuit described above; and a controller for activating the switch of the dynamic conversion circuit during a load transient; wherein activation of the switch comprises turning the switch on and off at a frequency higher than a switching frequency of the DC-DC converter.

The voltage regulator module may further comprise at least a second DC-DC converter. In various embodiments, the DC-DC converters may be of isolated or non-isolated circuit topologies, such as buck, boost, and buck-boost circuit topologies. In a preferred embodiment, the DC-DC converters are buck converters.

According to another aspect of the invention there is provided a method for increasing power output of a switching DC-DC converter during a load transient, comprising: connecting a series circuit in parallel with at least a portion of the DC-DC converter, the series circuit comprising a switch; and activating the switch in accordance with the load transient; wherein activating the switch comprises turning the switch on and off at a frequency higher than a switching frequency of the DC-DC converter.

In one embodiment, the method may comprise connecting a series circuit in parallel with at least a portion of the DC-DC converter, the series circuit comprising a switch and an inductor. In another embodiment, the method may comprise connecting the series circuit in parallel with a series output inductor of the DC-DC converter. Another embodiment may comprise connecting the series circuit in parallel with the DC-DC converter.

Activating the switch in accordance with the load transient may comprise activating the switch in accordance with at least one of: (i) a decrease in the output voltage of the DC-DC converter below a minimum output voltage; and (ii) an increase in output current of the DC-DC converter above an operating output current.

In one embodiment, activating the switch may comprise turning the switch on and off with a pulse train of constant duty cycle, the pulse train having a frequency higher than the switching frequency of the DC-DC converter. In another embodiment, activating the switch may comprise turning the switch on and off with a pulse train of varying duty cycle, the pulse train having a frequency higher than the switching frequency of the DC-DC converter.

The method of the invention may further comprise connecting two or more DC-DC converters in parallel, and connecting the series circuit in parallel with the two or more DC-DC converters.

BRIEF DESCRIPTION OF THE DRAWING

Embodiments of the invention will now be described by way of example, with reference to the accompanying drawings, wherein.

DETAILED DESCRIPTION OF THE EMBODIMENTS

According to one aspect of the invention there is provided a dynamic conversion circuit for use with a power converter, such as a switched mode DC-DC converter. The dynamic conversion circuit may be used with a power converter in a voltage regulator module. The dynamic conversion circuit is capable of responding rapidly to sudden changes in the load connected to the power converter output, which would otherwise result in a decrease in the output voltage from its nominal value. The dynamic conversion circuit prevents or minimizes any reduction in output voltage of the power converter resulting from a sudden increase in the load, by increasing the output current of the power converter during a load transient. Thus, the dynamic conversion circuit substantially improves the voltage regulation of the VRM under dynamic load conditions. The dynamic conversion circuit may be used with any isolated or non-isolated switching DC-DC converter, such as, for example, buck, boost, or buck-boost, for any load requiring tight voltage regulation under both steady-state and transient conditions. The invention will be described primarily with respect to a buck converter; however, it will be appreciated that the invention is not limited thereto. Further, the power conversion circuit may be used with either single phase or multiphase interleaved power converters, depending on how much load current is required. The dynamic conversion circuit is particularly suitable for a VRM for a microprocessor, which may present an extremely dynamic load to the VRM and at the same time require high current and regulation of supply voltage within very narrow limits.

According to the invention, increasing the switching frequency of the DC-DC converter is unnecessary, because an increased switching frequency is not needed to improve the dynamic response of the converter. The switching frequency may be kept below 500 kHz to achieve a higher efficiency and at the same time maintain a very fast dynamic response with greatly reduced output capacitance. The greatly reduced output capacitance enables the use of ceramic capacitors, which are smaller in size and have a much smaller equivalent series resistance (ESR). Consequently, a VRM according to the invention will require less space on a PCB board and cost will be reduced.

Figure 1:
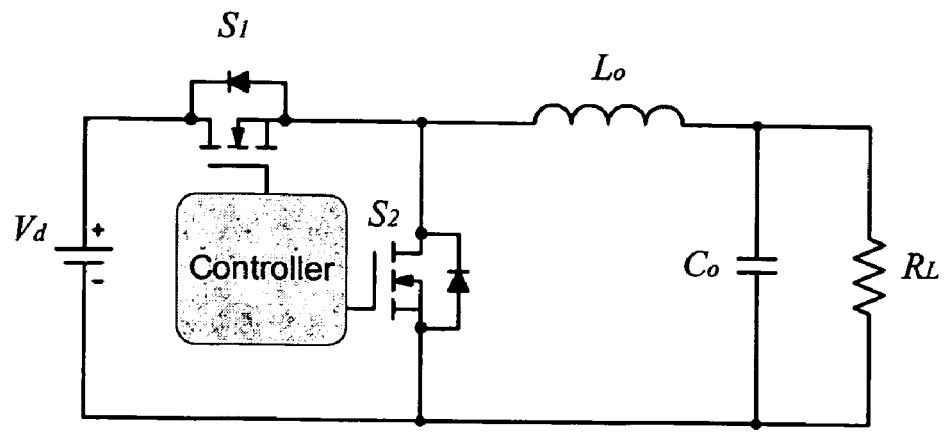
FIG. 1 is a schematic diagram of a prior art single phase synchronous buck converter.
Figure 2:
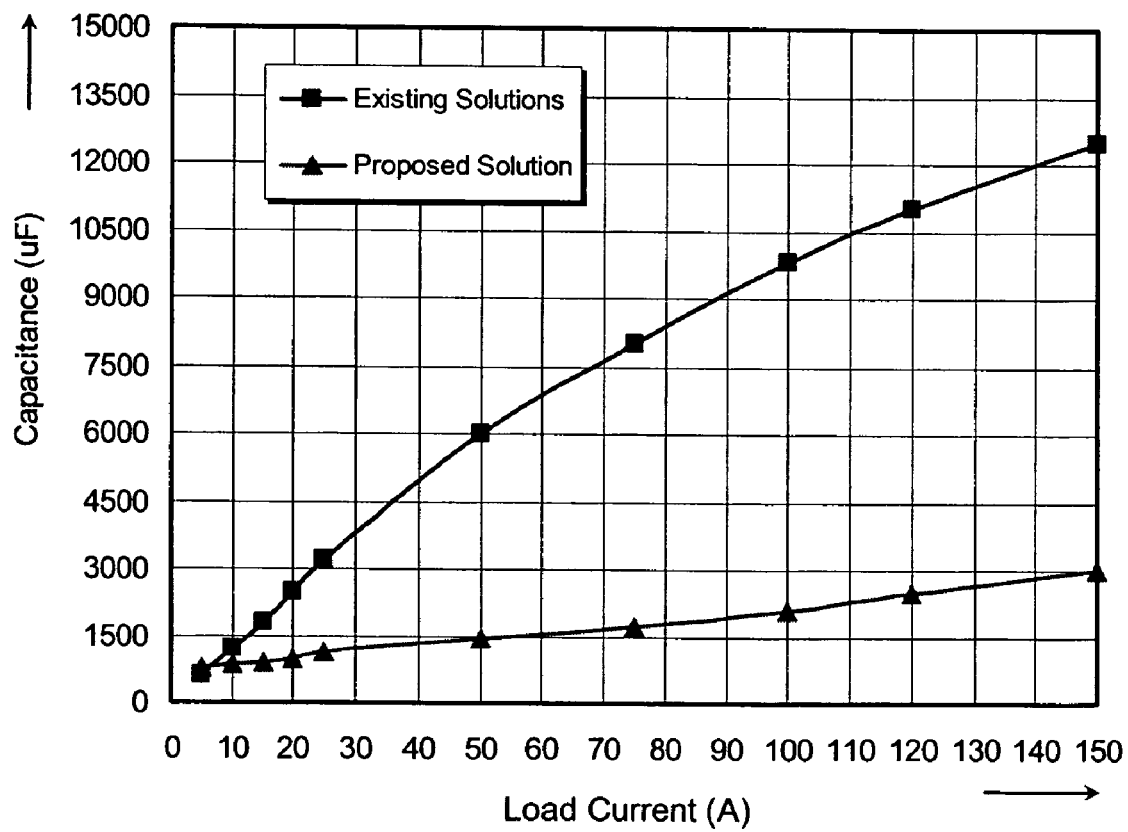
FIG. 2 is a plot of estimated output capacitance versus load current for the invention compared with prior art VRMs.
Figure 3:
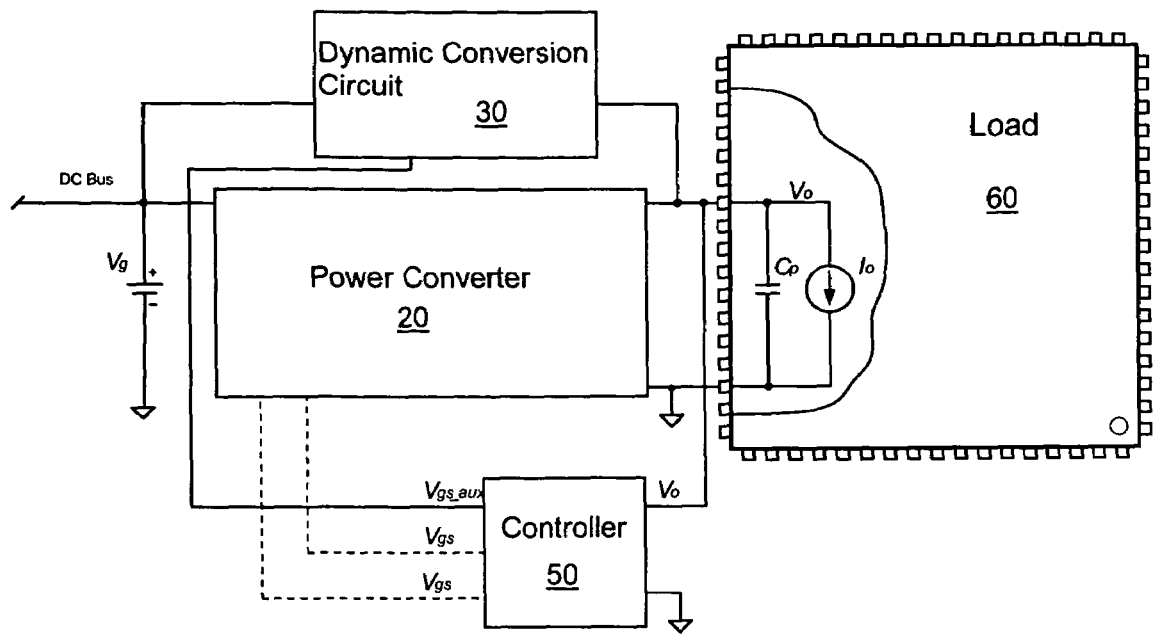
FIG. 3 is a block diagram of a VRM according to the invention.

FIG. 3 is a block diagram showing a VRM, which includes a power converter 20, a dynamic conversion circuit 30, and a controller 50. The VRM is connected to a load 60. The dynamic conversion circuit 30 is shown connected in parallel with the power converter 20; however, in some embodiments, the dynamic conversion circuit 30 may be connected in parallel with only a portion of the power converter 20. Such embodiments are discussed in detail below. As shown in FIG. 3, the controller 50 is connected to the output of the power converter (i.e., the output of the VRM), and has connections to the dynamic conversion circuit and optionally to the power converter. The controller 50 may be incorporated into the dynamic conversion circuit 30, or it may be a separate block as shown in FIG. 3. The controller may be implemented digitally, as described in our co-pending U.S. patent application Ser. No. 11/261,661, incorporated herein by reference in its entirety.

In one embodiment the dynamic conversion circuit comprises a switch, and, optionally, an output inductor connected in series with the switch. In one embodiment the dynamic conversion circuit is connected in parallel with the power converter. In such embodiment, the dynamic conversion circuit substantially provides a connection between the power supply (e.g., the DC bus) and the load when the switch of the dynamic conversion circuit is on, thereby providing the load with the required current, and minimizing any voltage drop experienced by the load. In another embodiment, the dynamic conversion circuit is connected in parallel with at least a portion of the power converter circuit, and thereby substantially bypasses that portion of the power converter circuit when the switch of the dynamic conversion circuit is on.

It will be appreciated that for proper operation of the VRM the dynamic conversion circuit should function only during a load transient; i.e., only when the current demand of the load rises above the steady state current so as to cause a drop in the output voltage of the power converter. Accordingly, the controller 50 shown in FIG. 3 senses the output voltage and/or current of the power converter. When the output voltage drops to or below a threshold voltage, and/or when the output current rises above an operating current (i.e., a steady state current), the controller sends a signal to the dynamic conversion circuit, activating the switch of the dynamic conversion circuit. Activating refers to turning the switch of the dynamic conversion circuit on and off at a frequency higher than the switching frequency of the power converter, such as for example, 2 to 10 times higher, or 2 to 100 times higher, or higher as may be possible with available technology. The controller may optionally control operation of the power converter during a load transient in a way that maximizes output current of the power converter (e.g., by providing gate signals for appropriately opening/closing switches of the power converter). The controller monitors the output voltage and/or current and keeps activating the switch of the dynamic conversion circuit as required to maintain the output voltage at the desired value.

According to another aspect of the invention there is provided a VRM comprising a DC-DC converter, a dynamic conversion circuit as described herein, and a controller.

Figure 4:
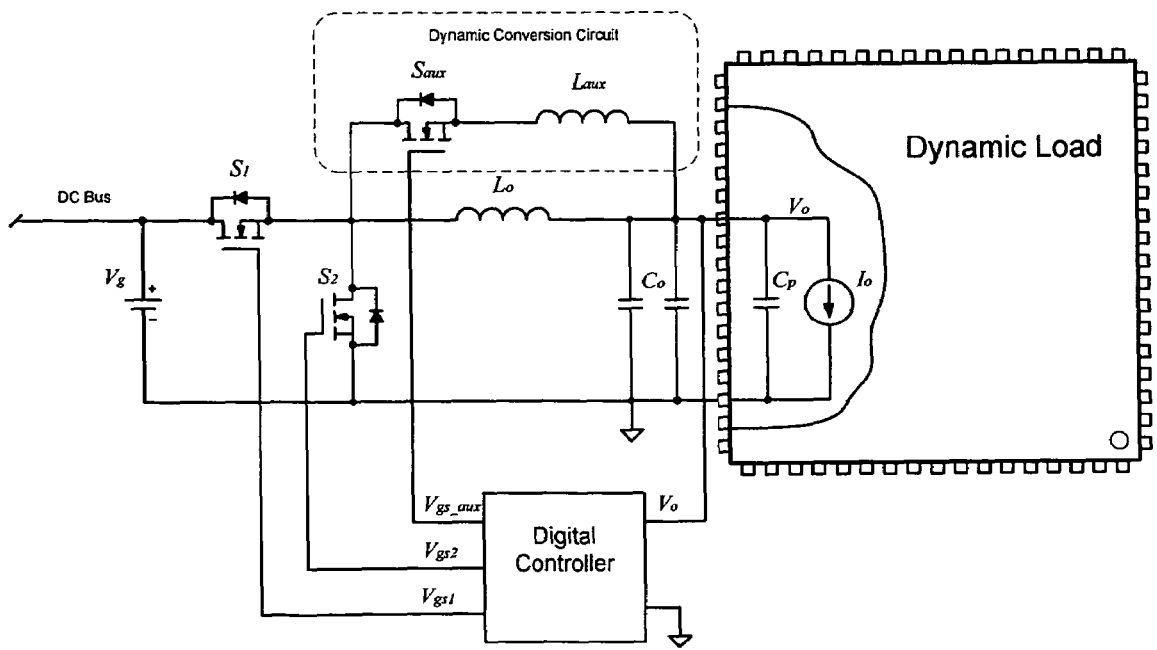
FIG. 4 is a schematic diagram of a single phase VRM circuit according to a first embodiment of the invention.

In one embodiment, the invention provides a single phase VRM as shown in FIG. 4. This embodiment comprises a synchronous buck converter with switches $S_1$, $S_2$, output inductor $L_o$, and output capacitor $C_o$, a dynamic conversion circuit with switch $S_{aux}$, inductor $L_{aux}$, and a controller. Preferably the controller is digitally implemented to realize the present control method for fast load transient response of the VRM. Inductor $L_{aux}$ in the dynamic conversion circuit has a substantially smaller value than that of $L_o$. $V_g$ is the input DC voltage, normally from the motherboard DC bus if the load is a microprocessor. $S_1$ and $S_2$ are the switching power devices, which accept the pulse width modulation (PWM) gate signals generated by the controller. $L_o$ and $C_o$ comprise the output filter of the synchronous buck converter. The load shown in FIG. 4 is a microprocessor.

The auxiliary power switch $S_{aux}$ of the dynamic conversion circuit is connected to the node formed by the connection of power switches $S_1$, $S_2$ and then is connected in series to auxiliary inductor $L_{aux}$, which is connected to the load terminal. Thus, the series circuit of $S_{aux}$ and $L_{aux}$ is connected in parallel with inductor $L_o$.

Figure 7:
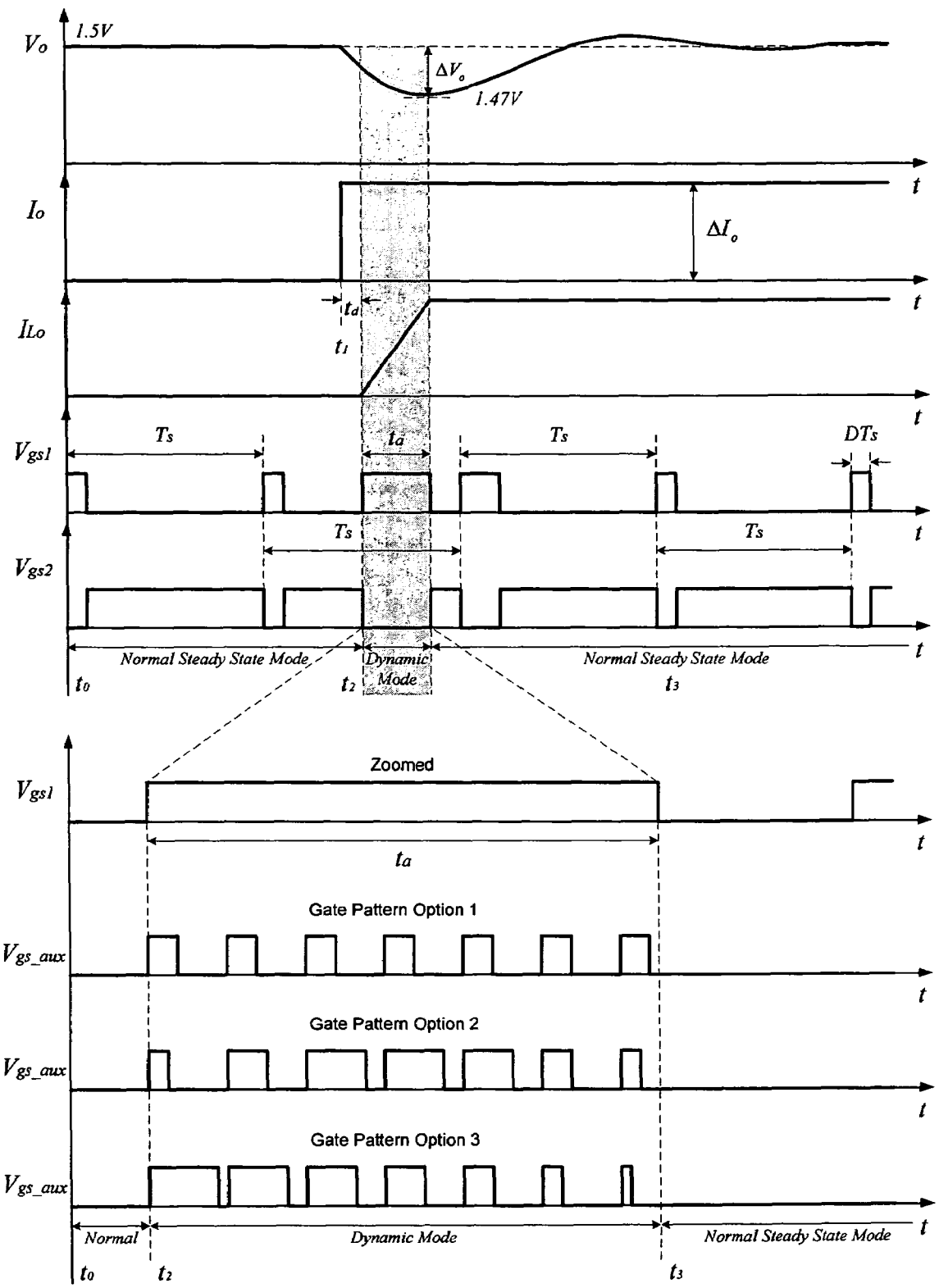
FIG. 7 shows waveforms of the single phase VRM circuit of FIG. 4.

During normal steady state operation or when a load transient is within a certain range (e.g., a load transient small enough that $V_o$ remains at or above a minimum (threshold) value), the pulse width of the gate signals to the synchronous buck converter switches $S_1$ and $S_2$ is determined by the sensed load voltage, the nature of the power converter, and the way the system is compensated. The waveforms of the gate signals $V_{gs1}$ and $V_{gs2}$ of $S_1$ and $S_2$ are shown in FIG. 7, in the time section referred to as Normal Steady State Mode ($t_0$-$t_2$, $t_3$-$\infty$). In this operation mode, the power switch $S_{aux}$ of the dynamic conversion circuit is in its off state, i.e., the dynamic conversion circuit will not have any effect when the load condition is normal and the VRM is in its normal steady state operation.

In FIG. 7, a sudden load current step $\Delta I_o$ occurs at time $t_1$. After a short processing time delay $t_d$, at time $t_2$, the controller detects the load change and turns on the power switch $S_1$. The switch $S_1$ is turned on and kept on for duration of $t_a$ and turned off at time $t_3$, while switch $S_2$ is kept off during this period. The time duration $t_a$ is calculated by the controller according to an algorithm. With this control method, the gate pulse to $S_1$, $V_{gs1}$ can be provided quickly and may be of sufficient width to supply current to the output filter inductor $L_o$ during a load transient. The current through $L_o$ can therefore be ramped up quickly to supply the load and thus maintain the output voltage level. The gate signals $V_{gs1}$ and $V_{gs2}$ during such a load transient are shown in FIG. 7, in the time section referred to as Dynamic Mode ($t_2$-$t_3$).

The dynamic conversion circuit is also activated by the controller during this load transient. When $S_1$ is turned on and $S_2$ is turned off for the time period $t_a$, the power switch $S_{aux}$ of the dynamic conversion circuit is activated. Here, "activated" refers to switching on and off of $S_{aux}$ many times within the time period $t_a$ (i.e., at a frequency higher than the switching frequency of the buck converter). Switching on and off of $S_{aux}$ may be carried out with or without modulating the pulse width of the gate drive signal $V_{gs\_aux}$. Three examples of such gate drive signals are shown in FIG. 7.

In FIG. 7, the time period $t_a$ is expanded to show the gate signals of $S_1$ and $S_{aux}$ in Dynamic Mode ($t_2$-$t_3$). In particular, it can be seen that during $t_a$, the switch $S_{aux}$ is activated and is switched at a fixed frequency much higher than that of the synchronous buck converter (e.g., 10 times higher). Because the inductor $L_{aux}$ in the dynamic conversion circuit has a substantially smaller value than that of $L_o$, the power transferred from the input to the output of the VRM during a load transient is greatly increased.

Three gate patterns of $S_{aux}$ during a load transient are shown in FIG. 7. However, the gate signal of $S_{aux}$ is not limited to those three patterns. The first gate pattern of $S_{aux}$ (option 1 in FIG. 7) switches $S_{aux}$ at a fixed switching frequency higher than that of the main power circuit, for example, 10 times higher. The pulse width of the gate signal is constant, predefined by the controller.

The second gate pattern of $S_{aux}$ (option 2 in FIG. 7) also switches $S_{aux}$ at a frequency higher than that of the main power circuit (e.g., 10 times higher). The gate signal is pulse width modulated. The output voltage of the VRM is sensed and compared with a reference voltage. The error between the sensed output voltage and the reference voltage is minimized by a compensator similar to the compensator of the main power circuit. However, the compensator for the dynamic conversion circuit may have a larger gain. The compensation may be implemented digitally by the controller. The pulse width of the gate is thus varying. Initially the duty cycle of the gate signal of $S_{aux}$ is the same as the duty cycle of the main power circuit in steady state operation. As the output voltage drops due to the load transient, the duty cycle of $V_{gs\_aux}$ increases according to the compensated PWM modulation. The duty cycle decreases as the output voltage increases. This gate pattern of $S_{aux}$ during a transient is realized by the controller.

The third gate pattern of $S_{aux}$, (option 3 in FIG. 7) also switches $S_{aux}$ at a frequency higher than that of the main power circuit. The pulse width of the gate signal is predefined to be large initially and then is decreased linearly as a function of time. The decreasing rate of the duty cycle is also predefined or calculated by the controller.

Figure 5:
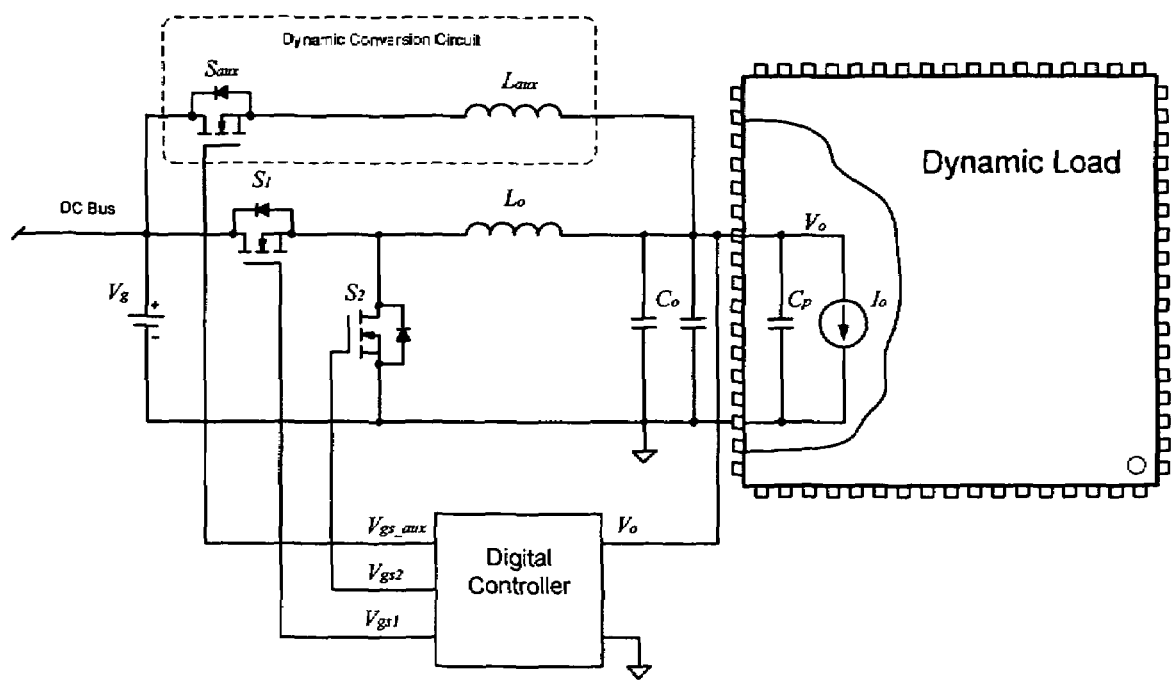
FIG. 5 is a schematic diagram of a single phase VRM circuit according to a second embodiment of the invention.

Another embodiment of a VRM according to the invention is shown in FIG. 5. In this embodiment the main power conversion circuit is a synchronous buck converter. $V_g$ is the input DC voltage. $S_1$ and $S_2$ are switching power devices, which accept pulse width modulation (PWM) gate signals generated by the controller. $L_o$ and $C_o$ are the output filter inductor and capacitor of the synchronous buck converter. The dynamic conversion circuit comprises an auxiliary power switch $S_{aux}$ which is connected to the input of the VRM in this embodiment, and then connected in series to an auxiliary inductor $L_{aux}$, which is connected to the load directly. Thus, the series circuit of the switch $S_{aux}$ and the inductor $L_{aux}$ is connected in parallel with the input and output of the DC-DC converter circuit. The operation modes and the control method of this embodiment are the same as that of the first embodiment, and are discussed above in detail.

Figure 6:
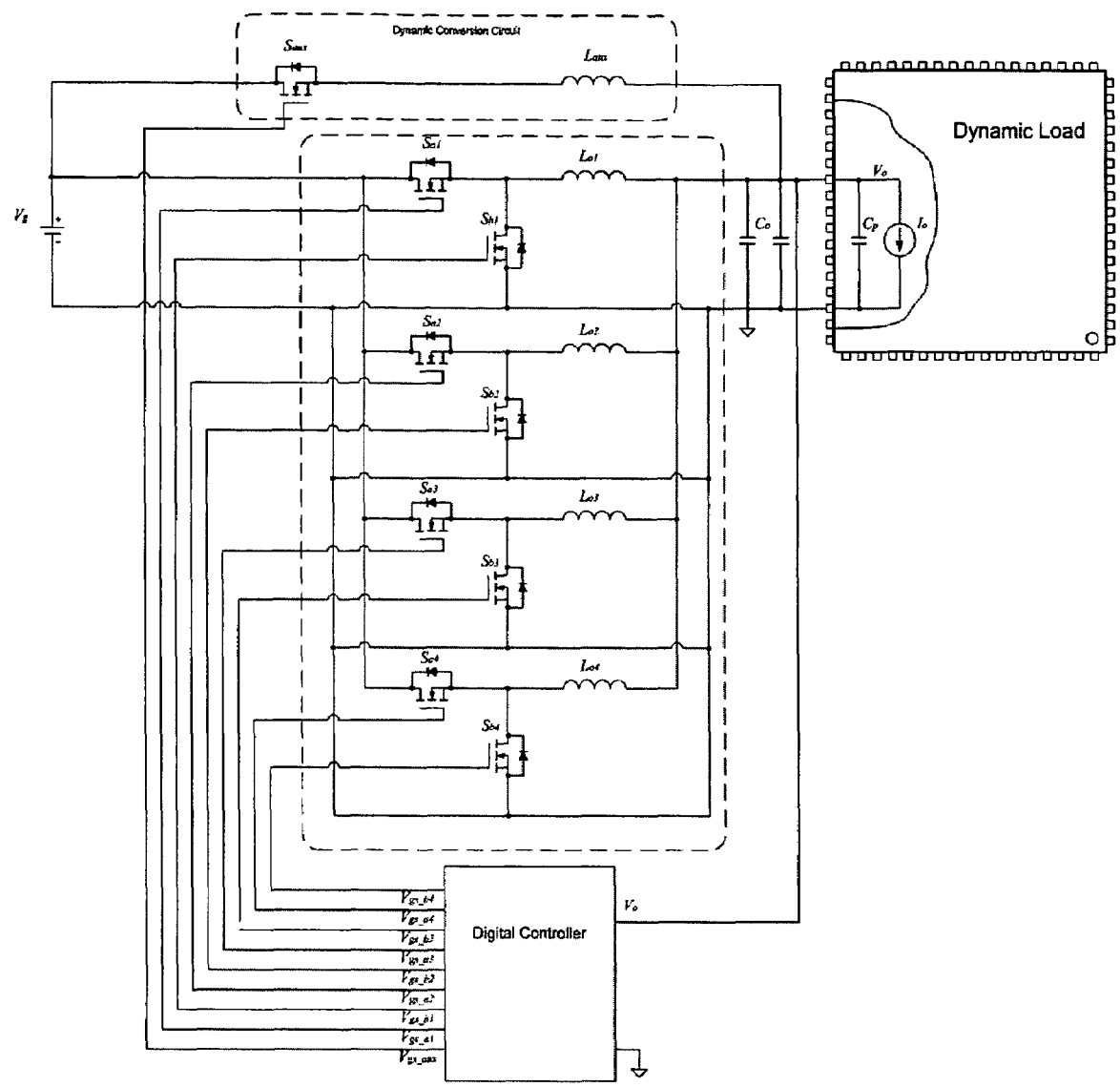
FIG. 6 is a schematic diagram of a multiphase interleaved VRM circuit according to a third embodiment of the invention.

A further embodiment of a VRM according to the invention is shown in FIG. 6. This embodiment relates to a multiphase interleaved synchronous buck converter. In FIG. 6, a four phase converter is shown; however, any number of phases may be implemented. Further, the phases are not limited to buck converters.

In FIG. 6, $S_{a1}$, $S_{b1}$, and $L_{o1}$ are the power switches and the output filter inductor of the first branch of the multiphase interleaved synchronous buck converter. $S_{a2}$, $S_{b2}$, and $L_{o2}$ are the power switches and the output filter inductor of the second branch of the multiphase synchronous buck converter, and so on. $C_o$ is the output filter capacitor of the VRM, which is shared by all of the synchronous buck converter branches. $I_o$ is the load current and represents the load.

Figure 8:
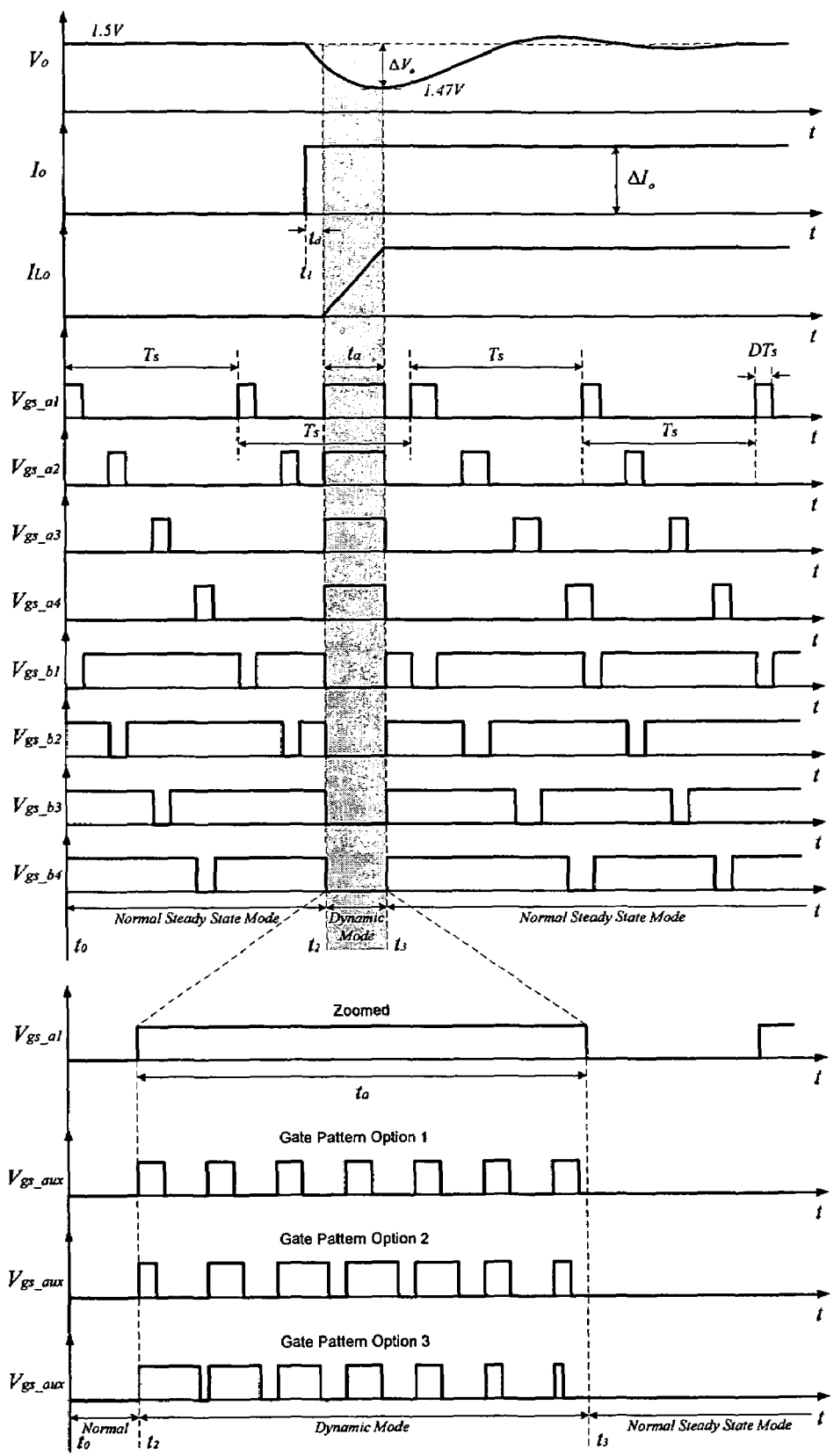
FIG. 8 shows waveforms of the multiphase interleaved VRM circuit of FIG. 6.

During normal steady state operation mode or when a load transient is within a certain range (e.g., a load transient small enough that $V_o$ remains at or above a minimum value), the pulse width of the gate signal to the synchronous buck converters is PWM modulated based on voltage mode control. However, the gate signals $V_{gs\_a1}$, $V_{gs\_a2}$, $V_{gs\_a3}$, and $V_{gs\_a4}$ are phase shifted as illustrated in FIG. 8. The gate signals $V_{gs\_b1}$, $V_{gs\_b2}$, $V_{gs\_b3}$, and $V_{gs\_b4}$ are complementary of gate signals $V_{gs\_a1}$, $V_{gs\_a2}$, $V_{gs\_a3}$ and $V_{gs\_a4}$. Under this operation mode, the power switch $S_{aux}$ of the dynamic conversion circuit is off. This operation mode is shown in the duration of $t_0$-$t_2$ and $t_3$-$\infty$ in FIG. 8.

During a load transient in the duration of $t_{o1}$-$t_2$ in FIG. 8, the switches $S_{a1}$, $S_{a2}$, $S_{a3}$, and $S_{a4}$ (FIG. 6) are turned on and kept on for a period of $t_a$ defined by the controller, while the switches $S_{b1}$, $S_{b2}$, $S_{b3}$, and $S_{b4}$ are kept off during this transient. The current through $L_{o1}$, $L_{o2}$, $L_{o3}$ and $L_{o4}$ can therefore be ramped up quickly to supply the load and thus help maintain the output voltage level. The dynamic conversion circuit is also activated by the controller during this load transient. When $S_{a1}$, $S_{a2}$, $S_{a3}$, and $S_{a4}$ are turned on and $S_{b1}$, $S_{b2}$, $S_{b3}$, and $S_{b4}$ are turned off for a time period of $t_a$, the power switch $S_{aux}$ of the dynamic conversion circuit is activated, as described above in respect of the embodiment shown in FIG. 4. Thus $S_{aux}$ is turned on and off at a frequency higher than the switching frequency of the buck converters. Exemplary gate signal patterns are shown in FIG. 8, and are the same as the examples described above.

The inductor $L_{aux}$ in the dynamic conversion circuit has a much smaller value than that of $L_{o1}$, $L_{o2}$, $L_{o3}$, and $L_{o4}$. The power transferred from the input to the output of the VRM during a load transient is thus further accelerated. Because of this dynamic conversion circuit, the values of inductors $L_{o1}$, $L_{o2}$, $L_{o3}$, and $L_{o4}$ can be larger than that of prior multiphase interleaved synchronous buck converters. This is because during the load transient, power is transferred from the input to the output primarily through the small inductor $L_{aux}$ of the dynamic conversion circuit. Also different from prior circuits, the power transfer through $L_{aux}$ is regulated during the transient for a much better regulated output voltage. Relatively larger $L_{o1}$, $L_{o2}$, $L_{o3}$, and $L_{o4}$ will reduce the current ripple of the circuit, and hence increase the efficiency of the converter. The control loop of the VRM will also be more stable if the inductors $L_{o1}$, $L_{o2}$, $L_{o3}$, and $L_{o4}$ have larger values. Since the filter inductors of the branches can be large, paralleling more phases for the purpose of reducing the ripple current becomes unnecessary. Thus the number of paralleled phases can be minimized, and phases are only paralleled for the purpose of transferring more load current.

The invention is further illustrated by way of the following non-limiting example.

EXAMPLE

Figure 9:
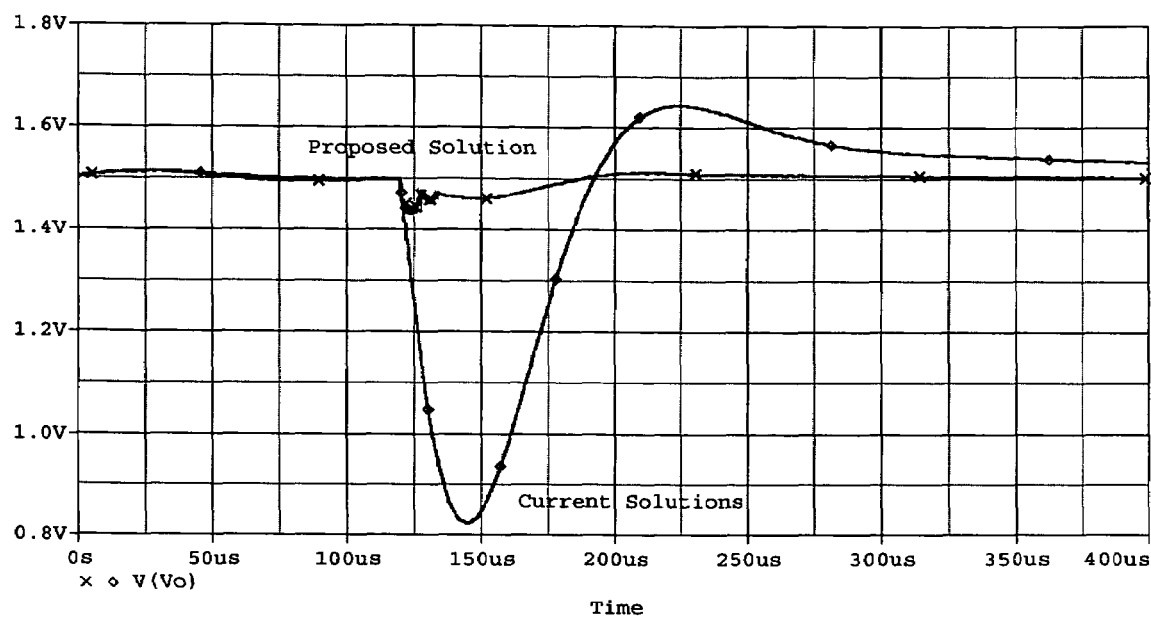
FIG. 9 is a plot showing the results of a simulation comparing the output voltage waveforms of a VRM of the invention and a conventional voltage mode controlled VRM during a load transient, in which $V_g=12\ V_{DC}$, $V_o=1.5\ V$, $I_o=25\ A$, $C_o=500\ \mu F$, $f_s=250\ kHz$, and the load steps from 0.5 A to 25 A.

A voltage regulator module based on a buck converter, including a dynamic conversion circuit as described herein, suitably, was simulated in PSPICE v.9.0 and its performance evaluated with respect to a VRM based on a typical buck converter. The input and output voltages of the two VRMs was 12 $V_{dc}$ and 1.5 $V_{dc}$ respectively, and the switching frequency of the two circuits was 250 kHz. The rated output current was 25 A and the load transient was from 0.5 A to 25 A, at a slew rate of 1000 A/μs. The results of the simulation are shown in FIG. 9, where it can be seen that the voltage drop of the VRM of the invention was less than 10% of that of the typical VRM. According to the simulation, to avoid exceeding a 70 mV output voltage drop at a 100% load current transient (25 A), an output capacitance of only 500 μF was required. In contrast, the conventional voltage mode controlled single phase VRM needed at least 5000 μF output filter capacitance. This is an approximately 10-fold reduction in output capacitance, which represents substantial savings in space on the printed circuit board, and ultimately in cost.

All cited documents are incorporated herein by reference in their entirety.

Those of ordinary skill in the art will recognize, or be able to ascertain through routine experimentation, equivalents to the embodiments disclosed herein. Such equivalents are within the scope of the invention and are covered by the appended claims.

The invention claimed is:

1. A dynamic conversion circuit for providing power output to a load during a load transient, the dynamic conversion circuit comprising:
   a series circuit comprising a switch, the series circuit connected in parallel with at least a portion of a DC-DC converter;
   a switch controller configured to activate the switch in accordance with the load transient; and
   the switch controller configured to turn the switch on and off at a higher switching frequency than a switching frequency of the DC-DC converter.

2. The dynamic conversion circuit of claim 1, wherein the series circuit further comprises an inductor in series with the switch.

3. The dynamic conversion circuit of claim 1, wherein the switch controller is configured to activate the switch in accordance with the load transient based on at least one of: (i) a decrease in the output voltage of the DC-DC converter below a minimum output voltage; and (ii) an increase in output current of the DC-DC converter above an operating output current.

4. The dynamic conversion circuit of claim 1, wherein the at least a portion of the DC-DC converter comprises a series output inductor.

5. The dynamic conversion circuit of claim 1, wherein the series circuit is connected in parallel with the DC-DC converter to couple energy from a voltage input of the DC-DC converter to an output voltage of the DC-DC converter connected to the load.

6. The dynamic conversion circuit of claim 2, wherein the inductor of the series circuit is of a smaller inductance value than an output inductor of the DC-DC converter.

7. The dynamic conversion circuit of claim 1, wherein the switch controller is configured to activate the switch by turning the switch on and off with a pulse train of constant duty cycle, the pulse train being of a frequency higher than the switching frequency of the DC-DC converter.

8. The dynamic conversion circuit of claim 1, wherein the switch controller is configured to activate the switch by turning the switch on and off with a pulse train of varying duty cycle, the pulse train being of a frequency higher than the switching frequency of the DC-DC converter.

9. The dynamic conversion circuit of claim 1, wherein the switch controller is configured to sense the output voltage of the DC-DC converter and control activation of the switch.

10. The dynamic conversion circuit of claim 1, wherein the DC-DC converter is of a non-isolated circuit topology.

11. The dynamic conversion circuit of claim 1, wherein the DC-DC converter is of a configuration selected from buck, boost, and buck-boost circuit topologies.

12. The dynamic conversion circuit of claim 1, wherein the DC-DC converter is a buck converter.

13. A voltage regulator comprising:
a switching DC-DC converter having an input for accepting an input DC voltage and an output for outputting a DC output voltage to a load;
a dynamic conversion circuit comprising a switch circuit, the switch circuit connected in parallel with the DC-DC converter to convey energy received from the input DC voltage to the load; and
a controller configured to activate the switch circuit of the dynamic conversion circuit during a load transient, the controller configured to turn the switch on and off at a frequency higher than a concurrently operating switching frequency of the DC-DC converter.

14. The voltage regulator of claim 13, wherein the switch circuit includes a switch in series with an inductor, a series combination of the switch and the inductor of the dynamic conversion circuit being in parallel with the DC-DC converter.

15. The voltage regulator of claim 13, further comprising at least a second DC-DC converter.

16. A method for increasing power output during a load transient, the method comprising: operating a series circuit in parallel with at least a portion of a DC-DC converter, the series circuit comprising a switch; and activating the switch in accordance with the load transient; wherein activating the switch comprises turning the switch on and off at a frequency higher than a switching frequency of the DC-DC converter.

17. The method of claim 16, wherein the series circuit further comprises an inductor in series with the switch.

18. The method of claim 16, wherein activating the switch in accordance with the load transient comprises activating the switch in accordance with at least one of:
(i) a decrease in the output voltage of the DC-DC converter below a minimum output voltage; and
(ii) an increase in output current of the DC-DC converter above an operating output current.

19. The method of claim 16, comprising connecting the series circuit in parallel with a series output inductor of the DC-DC converter.

20. The method of claim 16, comprising connecting the series circuit in parallel with the DC-DC converter.

21. The method of claim 16, wherein activating the switch comprises turning the switch on and off with a pulse train of constant duty cycle, the pulse train having a frequency higher than the switching frequency of the DC-DC converter.

22. The method of claim 16, wherein activating the switch comprises turning the switch on and off with a pulse train of varying duty cycle, the pulse train having a frequency higher than the switching frequency of the DC-DC converter.

23. The method of claim 20, further comprising connecting two or more DC-DC converters in parallel, and connecting the series circuit in parallel with the two or more DC-DC converters.

24. The dynamic conversion circuit as in claim 1, wherein the switch controller is configured to operate the switch of the series circuit at a first non-zero switching frequency while the DC-DC converter is simultaneously operated at a second non-zero switching frequency, the first non-zero switching frequency being greater than the second non-zero switching frequency.

25. The dynamic conversion circuit as in claim 24, wherein, prior to the load transient, the DC-DC converter provides power to the load and the switch controller disables the series circuit from providing power to the load by setting the switch to an off state; and
wherein the switch controller is configured to detect the load transient and, in response to detecting the load transient, initiate activation of the switch at the higher switching frequency than the switching frequency of the DC-DC converter.

26. The dynamic conversion circuit as in claim 25, wherein the series circuit further comprises an inductor in series with the switch.

27. The dynamic conversion circuit as in claim 26, wherein the inductor of the series circuit is of a smaller inductance value than an output inductor of the DC-DC converter; and
wherein both the series circuit and the DC-DC converter are configured to convey power from a common voltage source to the load.

28. The dynamic conversion circuit as in claim 8, wherein the switch controller is configured to activate the switch at the varying duty cycle while the DC-DC converter is simultaneously being switched via a non-varying duty cycle.

29. The voltage regulator as in claim 13, wherein the controller is configured to operate a switch of the switch circuit at a first non-zero switching frequency while the DC-DC converter is simultaneously operated at a second non-zero switching frequency, the first non-zero switching frequency being greater than the second non-zero switching frequency.

30. The voltage regulator as in claim 29, wherein the switch circuit is configured to have a faster response time and deliver a higher rate of power to the load than the DC-DC converter; and
wherein the controller initiates activation of the switch circuit in response to detecting the load transient.

31. The dynamic conversion circuit as in claim 1, wherein the higher switching frequency is based on a time between turning the switch to an ON state and a subsequent time of turning the switch to an ON state.

32. The dynamic conversion circuit as in claim 31, wherein the time between turning the switch to the ON state and the subsequent time of turning the switch to the ON state is less than a time between switching of a power switch in the DC-DC converter from an ON state and a subsequent ON state.

33. The dynamic conversion circuit as in claim 1, wherein the higher switching frequency of the switch is based on a switching cycle including a duration of time in which the switch is turned ON and a duration of time in which the switch is turned OFF.

34. The dynamic conversion circuit as in claim 33, wherein the switch controller is configured to:
deactivate power switches in the DC-DC converter during the load transient; and
during deactivation of the power switches, initiate multiple cycles of turning the switch ON and OFF to supply power to the load during the transient.

35. The dynamic conversion circuit as in claim 33, wherein the switch controller is configured to:
initiate multiple cycles of turning the switch ON and OFF to supply power to the load during the transient; and
control an ON pulse width for each of the multiple cycles to regulate an output voltage driving the load.

36. The dynamic conversion circuit as in claim 35, wherein the switch controller is configured to:
increase the ON pulse width in response to detecting a drop in the output voltage.

37. The dynamic conversion circuit as in claim 13, wherein the frequency of the switch is based on a switching cycle of the switch circuit, the switching cycle including a duration of time in which the switch circuit is turned ON added to a duration of time in which the switch circuit is turned OFF.

38. The method as in claim 16, wherein turning the switch on and off at the higher frequency includes:

generating a pulse cycle, the pulse cycle including a first duration of time in which to activate the switch and a second duration of time in which to deactivate the switch, the pulse cycle being shorter than a corresponding pulse cycle in which a power switch of the DC-DC converter is turned on and off to provide power to the load.

* * * * *